United States Patent
Beach et al.

(10) Patent No.: US 7,354,476 B2
(45) Date of Patent: *Apr. 8, 2008

(54) INKJET INK COMPOSITION

(75) Inventors: Bradley Leonard Beach, Lexington, KY (US); Alberto Carrillo, Johnson City, TN (US); Stephen A. Crescimanno, Hatfield, PA (US); Michael Paul Hallden-Abberton, Maple Glen, PA (US); Ann P. Holloway, Lexington, KY (US); Anna Marie Pearson, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/106,244

(22) Filed: Apr. 14, 2005

(65) Prior Publication Data

US 2005/0282929 A1    Dec. 22, 2005

Related U.S. Application Data

(60) Provisional application No. 60/581,965, filed on Jun. 22, 2004.

(51) Int. Cl.
*C08J 3/00* (2006.01)

(52) U.S. Cl. .................. 106/31.6; 106/31.13; 523/160; 523/161; 526/318.3; 526/317.1; 524/800; 524/832; 524/556

(58) Field of Classification Search ............ 523/160, 523/161; 526/318.3; 524/800, 556, 318.3, 524/317.1; 106/31.27, 31.6
See application file for complete search history.

(56) References Cited

U.S. PATENT DOCUMENTS

| | | | |
|---|---|---|---|
| 5,470,895 A * | 11/1995 | Kidder et al. | 523/335 |
| 5,853,861 A | 12/1998 | Held | |
| 6,184,268 B1 * | 2/2001 | Nichols et al. | 523/160 |
| 6,271,285 B1 | 8/2001 | Miyabayashi et al. | |
| 6,387,168 B1 * | 5/2002 | Koitabashi et al. | 106/31.6 |
| 6,646,024 B2 | 11/2003 | Beach et al. | |
| 6,693,147 B2 | 2/2004 | Johnson et al. | |
| 6,716,912 B2 | 4/2004 | Freeman et al. | |
| 2003/0149133 A1 * | 8/2003 | Lau et al. | 523/160 |
| 2003/0176532 A1 | 9/2003 | Chung et al. | |
| 2004/0213989 A1 * | 10/2004 | Hasskerl et al. | 428/327 |
| 2005/0137319 A1 | 6/2005 | Vincent et al. | |

FOREIGN PATENT DOCUMENTS

JP    HEI 10-120952    5/1998

* cited by examiner

*Primary Examiner*—Sanza L. McClendon
(74) *Attorney, Agent, or Firm*—Dinsmore & Shohl, LLP

(57) ABSTRACT

An inkjet ink composition having a binder including an aqueous dispersion of polymer particles, the polymer comprising as polymerized units from 3 to 20 wt. % monoethylenically unsaturated acid monomer, based on polymer weight, and having a glass transition temperature (Tg) in the range of from −40° C. to 120° C., and the polymer particles having a volume average particle diameter as measured by dynamic light scattering of at least 35 nanometers greater than the weight average particle diameter as measured by capillary hydrodynamic fractionation is provided. An inkjet ink composition including the inkjet ink binder is also provided.

25 Claims, No Drawings

INKJET INK COMPOSITION

This application claims the benefit of U.S. Provisional Application No. 60/581,965, filed Jun. 22, 2004. The present invention was a result of activities undertaken within the scope of a joint research agreement between Lexmark International, Inc. and The Rohm and Haas Company.

This invention relates to a binder composition for ink jet inks and inkjet inks including the binder. In particular, this invention relates to an inkjet ink binder including an aqueous dispersion of polymer particles, the polymer including as polymerized units from 3 to 20 wt. % monoethylenically unsaturated acid monomer, based on polymer weight, and having a glass transition temperature ("Tg" herein) in the range of from −40° C. to 120° C., and the polymer particles having a volume average particle diameter as measured by dynamic light scattering ("DLS") of at least 35 nm greater than the weight average particle diameter as measured by capillary hydrodynamic fractionation ("CHDF"). In addition the invention relates to an inkjet ink composition including the inkjet ink binder, a colorant and a liquid medium.

U.S. Pat. No. 6,716,912 discloses a polymeric binder useful for water-resistant inkjet inks wherein the binder contains an acid component in the range from about 1 to about 10 wt % of the polymer, a Tg in the range from about −20° C. to about 25° C., and an average particle diameter in the range from about 250 to about 400 nm and a particle size distribution such that essentially all the particles have a diameter in the range from 130 to 450 nm. Wet-rub smear of prints formed from these inks or resistance to smearing by highlighter pens was excellent.

Inkjet ink binders which, when incorporated into an inkjet ink, provide wet-rub smear resistance and resistance to smearing by highlighter pens in a variety of ink formulations. However the inkjet binder, when incorporated into an inkjet ink, may have a negative effect on the jetting reliability of the printhead. Further, the jettability of inks containing a surface modified pigment in combination with traditional latex emulsion polymer binders needs improvement. Accordingly, there is a need for surface modified pigment-containing ink jet ink compositions which exhibit good printing properties particularly in terms of improved resistance to highlighter smear while maintaining acceptable reliability of the print cartridge and jettability of the ink composition.

The inkjet binder of the present invention, when incorporated into inkjet inks, provides such performance.

According to a first aspect of the present invention there is provided an inkjet ink binder comprising an aqueous dispersion of polymer particles, said polymer comprising as polymerized units from 3 to 20 wt. % monoethylenically unsaturated acid monomer, based on polymer weight, and having a glass transition temperature in the range of from −40° C. to 120° C., and said polymer particles having a volume average particle diameter as measured by dynamic light scattering (DLS) of at least 35 nanometers greater than the weight average particle diameter as measured by capillary hydrodynamic fractionation (CHDF).

According to a second aspect of the present invention there is provided an inkjet ink composition comprising a colorant, a liquid medium, and an inkjet ink binder, said binder comprising an aqueous dispersion of polymer particles, said polymer comprising as polymerized units from 3 to 20 wt. % monoethylenically unsaturated acid monomer, based on polymer weight, and having a glass transition temperature (Tg) in the range of from −40° C. to 120° C., and said polymer particles having a volume average particle diameter as measured by DLS of at least 35 nanometers greater than the weight average particle diameter as measured by CHDF.

The present invention relates to an inkjet ink binder including an aqueous dispersion of polymer particles, the polymer including as polymerized units from 3 to 20 wt %, preferably from 3.5 to 8 wt %, more preferably from 4 to 7 wt %, and most preferably from 3 to 6 wt %, monoethylenically unsaturated acid monomer, based on polymer weight. Suitable acid monomers include, for example, acrylic acid, methacrylic acid, crotonic acid, itaconic acid, fumaric acid, maleic acid, monomethyl itaconate, monomethyl fumarate, monobutyl fumarate, sodium vinylsulfonic acid, and acrylamidopropane sulfonic acid. Precursor monomers which form acid monomers before, during, or after polymerization such as maleic anhydride and sodium vinylsulfonates are also included. Preferred acid monomers are carboxylic acid monomers such as methacrylic acid, acrylic acid, and combinations thereof.

The polymer of the inkjet ink binder also includes at least one second copolymerized ethylenically unsaturated monomer such as, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; N-substituted (meth)acrylamides; amino-functional and ureido-functional monomers; monomers bearing acetoacetate-functional groups; styrene and substituted styrenes; butadiene; fluoro(meth)acrylates; ethylene, propylene, a-olefins such as 1-decene; vinyl acetate, vinyl butyrate and other vinyl esters; and vinyl monomers such as vinyl chloride, vinylidene chloride.

The aqueous emulsion copolymer may contain from 0% to 5%, by weight based on the dry weight of the copolymer, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred is the use of no copolymerized multi-ethylenically unsaturated monomers.

The glass transition temperature ("Tg") of the emulsion copolymer is from −40° C. to 120° C., preferably from −30° C. to 100° C., more preferably from −30° C. to 40° C., and most preferably from −20° C. to 25° C. Tgs used herein are those determined by differential scanning calorimetry ("DSC").

The inkjet ink binders are typically prepared by emulsion polymerization. The polymerization techniques used to prepare aqueous emulsion polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 10° C. and 95° C., more preferably between 20° C. and 90° C. The monomer mixture may be added neat or as an emulsion in water. The monomer mixture may be added in one or more additions or continuously, linearly or not, or combinations thereof, over the reaction period that is typically from 60 to 140 minutes.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

In a preferred embodiment of the present invention the polymer particles of the inkjet ink binder are formed by emulsion polymerization in the presence of a neutralizer in the amount of from 15 to 75%, on an equivalents basis, based on the monoethylenically unsaturated acid monomer. By "neutralizer" herein is meant a basic material which is capable of entering into an acid-base reaction with the acid monomer. Suitable neutralizers include, for example, hard bases and soft bases, such as ammonia, sodium hydroxide, potassium carbonate, sodium carbonate, and sodium bicarbonate. Preferably hard bases are used as the neutralizer. The pH of the reaction medium is typically between 5 and 9. In another embodiment, at least half of the polymer (by wt) is formed in the presence of a neutralizer in the amount of from 15 to 75%, on an equivalents basis, based on the monoethylenically unsaturated acid monomer employed in that fraction of the polymerization reaction.

In one embodiment of the present invention the aqueous emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. Each of the stages of the multi-staged emulsion polymer may contain the same monomers, surfactants, chain transfer agents, etc. as disclosed herein-above for the polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The weight average particle diameter of the polymer particles is typically from 100 to 450 nm, preferably from 140 to 400 nm, and more preferably from 200 to 350 nm, as measured by CHDF. The volume average particle diameter as measured by DLS is at least 35 nm, preferably at least 40 nm, more preferably at least 45 nm, and most preferably at least 55 nm, greater than the weight average particle diameter as measured by CHDF. The particle size distribution may be unimodal, bimodal, or polymodal; a unimodal distribution is preferred.

The inkjet ink of the present invention includes the inkjet ink binder; a liquid medium, preferably predominantly water and more preferably deionized water; and a colorant, such as a dye, pigment, or combinations thereof, preferably an organic or inorganic pigment. Typically the binder is present at a level of from 0.1 to 10 wt %, preferably from 0.5 to 3 wt %, based on the total weight of the ink. The aqueous carrier may be water; preferably, deionized water. Typically the aqueous carrier is present at from 40 to 95 wt %, preferably from 55 to 80 wt %, and more preferably, from 70 to 80 wt % based on the total weight of the ink.

The inkjet ink typically includes a pigment. As a result of the physical properties of pigments, pigment based ink compositions have a tendency to dry smear, have low resistance to wet-rub and have low highlighter resistance. The term "dry smear," as used herein, means applying abrasive pressure across the printed substrate and measuring any smear created thereby. The term "highlighter resistance," as used herein, means applying abrasive pressure across the printed substrate with a commercially available highlighting marker and measuring any smear created thereby; an example of such marker is Sanford Corp. MAJOR ACCENT brand highlighting markers.

Suitable pigments include, for example, organic pigments such as azo compounds, phthalocyanine pigments, quinacridone pigments, anthraquinone pigments, dioxazine pigments, indigo, carbon black, thioindigo pigments, perynone pigments, perylene pigments, and isoindolene; and inorganic pigments such as titanium dioxide, iron oxide, and metal powders. Typically the amount of colorant used is less than 10 wt %, preferably from 0.5 to 10 wt %, and more preferably from 0.5 to 7%, based on the total weight of the ink. Preferably, the pigment particle size is from 0.05 to 5 microns, more preferably not more than one micron and most preferably not more than 0.3 microns.

The inkjet ink may include a pigment dispersant. Suitable polymeric dispersants are known in the art, for example, in U.S. Pat. No. 5,821,283, U.S. Pat. No. 5,221,334, U.S. Pat. No. 5,712,338, and U.S. Pat. No. 5,714,538. Alternatively, pigment known as a self-dispersed pigment may be used or mixtures of a self-dispersed pigment and a pigment with dispersant. Pigments known as self-dispersed pigments or self-dispersing have been created with a surface modification. Such pigments can be surface modified in a variety of ways including, but not limited to, treatment with alkali salts of hypochlorite, ozone, and diazonium salts of aromatic sulfonic acid additions. These surface modified pigments have the distinct advantage of being self-dispersed in aqueous media and can be used without a corresponding polymeric dispersing agent. The surface modification can be performed on both black and color pigments.

For the purposes of this invention, the polymeric dispersant composition is not critical as long as its use results in a stable and printable ink. Polymeric dispersants are typically used at 0.1 to 5 wt %, based on the total weight of the ink. Pigment dispersions may be made by mixing pigment, dispersant, water, and optional additives and milling in, for example, a horizontal media mill, a vertical media mill, and an attritor mill.

The inkjet ink may also include, for example, humectants, dispersants, penetrants, chelating agents, buffers, biocides, fungicides, bactericides, surfactants, anti-curling agents, anti-bleed agents and surface tension modifiers. Useful humectants include ethylene glycol, 1,3 propanediol, 1,4 butanediol, 1,4 cyclohexanedimethanol, 1,5 pentanediol, 1,2-hexanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, 2-pyrrolidone, 1-methyl-2-pyrrolidone, 1-methyl-2-piperidone, N-ethylacetamide, N-methylpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, sorbitol, pantothenol, Liponic EG-1. Preferred humectants are polyethylene glycol with average molecular weight of 400 to 1000, 2-pyrrolidone 2,2 thiodiethanol, and 1,5 pentanediol. The amount of humectant used may range from 1 to 30 wt %, preferably from 5 to 15 wt %, based on the total weight of the ink. Preferred penetrants are 1,2 $C_1$-$C_6$ alkyl diols, such as 1,2 hexanediol; N-propanol; isopropanol; and hexyl carbitol. The amount of penetrant used may range from 0.1 to 10 wt %, based on the total weight of the ink.

The inkjet ink may be prepared by any method known in the art such as, for example, by mixing, stirring or agitating the ingredients together.

The inkjet ink may be applied to a substrate such as paper, vinyl, and the like using thermal or piezoelectric inkjet ink printers such as, for example, Lexmark 7000, Lexmark 5700, Lexmark Z32, Lexmark Z51, Lexmark Z-65, Lexmark 2050 printers, Epson Stylus 3000, C-82, C-84, Hewlett-Packard DeskJet 550, 570, 694C, 698, 894, 895Ci, and Canon 750. The ink may be allowed to dry at ambient temperature or heated to dry at a higher temperature.

The following examples are illustrative of the invention.

Inkjet Ink Composition 1 (in wt. %):
  4% colorant (self dispersed carbon black)
  3% inkjet ink binder
  7.5% polyethylene glycol 400
  7.5% 2-pyrrolidone
  1.2% 1,2-hexanediol
  0.4% hexyl carbitol
  balance deionized water Inkjet Ink Composition 2 (in wt %):
  4% colorant (2% self dispersed carbon black and 2% carbon black/dispersant mixture)
  3% inkjet ink binder
  7.5% polyethylene glycol 400
  7.5% 2-pyrrolidone
  1.2% 1,2-hexanediol
  0.4% hexyl carbitol
  balance deionized water Experimental Methods: Ink compositions were evaluated for reliability and highlighter resistance. Reliability was tested using a current commercial print cartridge in a 90 page high stress test. The commercial print cartridge utilized had 208 nozzles and the number reported from the reliability test was the number of nozzles firing at page 90; values presented were the mean of six trials. The highlighter resistance test was used for all smear resistance testing. Highlighter resistance was tested using two to three highlighters (Hi-Lighter™ by Avery, Accent™ by Sanford, and Spotliter Supreme™ by Pilot) on printed text or images on paper (Microprint Laser™ 1000 paper by Georgia Pacific) over a set period of time The weight average particle diameter herein is that determined by CHDF using a Matec model-2000 CHDF measurement system with a C-202 cartridge and GR-500 (2×) eluant (diluted 1/20). The CHDF instrument was calibrated with nominal 50, 100, 200, 300, 400, 500, 600, and 700 nm polystyrene column standards ("Nanosphere™" standards from Duke Scientific Corp., Palo Alto, Calif., USA) using the "new sigmoid fit" procedure (Matec CHDF-2000 software, version 3.20). Particle sizes were calculated using the deconvolution calculation for maximum resolution. The "DLS" volume average particle diameter herein is that measured by dynamic light scattering using a Microtrac model # UPA-150 instrument (Microtrac Industries, Northborough, MA, USA).

Glass transition temperatures were measured by Differential Scanning Calorimetry with a model Q-1000 DSC instrument (TA Instruments, New Castle, Del., USA) at a temperature ramp rate of 20° C./minute (after pre heating the sample to 150° C. for 5 min) on a 16 mg sample in a nitrogen atmosphere, using "Universal Analysis" software (version 4.0.0) to calculate the midpoint of the transition.

All ranges disclosed herein are inclusive and the minimums and maximums of the nested ranges are combinable.

Abbreviations Used Herein:
Wt %=weight percent
SLS=sodium lauryl sulfate
NaPS=sodium persulfate
KDDBS=potassium n-dodecyl benzenesulfonate
MMA=methyl methacrylate
MAA=methacrylic acid
AA=acrylic acid
BA=butyl acrylate
EHA=2-ethylhexyl acrylate
DI water=deionized water

COMPARATIVE EXAMPLE A

Preparation of inkjet ink binder. This example is prepared according to the teachings of U.S. Pat. No. 6,716,912. After heating 225 g buffered DI water (0.169 meq buffer/g of water) and 1.3 g SLS (28% Solids) to 88° C., 4% of a mixture of 293 g water, 3.56 g SLS (28%), 175 g MMA, 388 g BA, and 7.5 g MAA was added with a 6 g water rinse followed by 2.25 g NaPS in 4.7 g of water. This mixture was held at 88° C. for 10 minutes. Then, the remaining monomer mix was added gradually followed by 8.5 g water. The reaction mixture was held at 88° C. for 35 minutes and then cooled to 50° C., followed by the addition of 1136 g of deionized water. The mixture was further cooled to 30° C. and a 27 g portion of 4% KOH in water was added to pH 8.7. The product was then filtered through 100 and 325 mesh screens. To 500 g of the filtered product was added 0.78 g of SLS (28%). The sample was 25.0% solids, the CHDF weight average particle diameter was 270 nm, the DLS volume average diameter was 291 nm, and the Tg was −10.6° C. (DSC).

EXAMPLE 1

Preparation of inkjet ink binder. After heating 240 g buffered DI water (0.573 meq buffer/gm of water) and 0.40 g SLS (28% Solids) to 88° C., 6% of a mixture of 293 g water, 3.56 g SLS (28%), 188 g MMA, 89 g BA, 266 g EHA, 27.1 g MAA, and 6 g water was added followed by 2.25 g NaPS in 4.7 g of water. This combination was held at 88° C. for 10 minutes. Then, the remaining monomer mix was added gradually followed by 8.5 g water. The reaction mixture was held at 88° C. for 35 minutes and then cooled to 50° C., followed by the addition of 1026 g of deionized water. The mixture was further cooled to 30° C. and a 134 g portion of 4% KOH in water was added to pH 8.7. The product was then filtered through 100 and 325 mesh screens. To 500 g of the filtered product was added 0.97 g of SLS (28%). The CHDF weight average particle diameter was 269 nm, the DLS volume average diameter was 353 nm, and the Tg was −10.1° C. (DSC).

EXAMPLE 2

Preparation and Evaluation of Inkjet inks. Inks were prepared from the inkjet in binders of Comparative Example A and of Example 1 in each instance according to Inkjet ink compositions 1 and 2.

TABLE 2.1

Evaluation of inkjet inks

| Inkjet Ink Binder of Example | Ink Composition | Wt. Avg. Diameter (CHDF) | Vol. Avg. Diameter (DLS) | Printing Reliability at Page 90 | Highlighter Resistance |
|---|---|---|---|---|---|
| Comp. A | 1 | 270 | 291 | 8 | Good+ |
| Comp. A | 2 | 270 | 291 | 181 | Good+ |
| 1 | 1 | 269 | 353 | 207 | Good |
| 1 | 2 | 269 | 353 | 190 | Good |

Inkjet inks including binder Example 1 of the present invention exhibit both good highlighter resistance and printing reliability independent of the ink composition, whereas the printing reliability of inks including binder Comparative Example A do not.

COMPARATIVE EXAMPLE B

Preparation of inkjet ink binder. After heating 265 g DI water, and 0.41 g SLS (28% Solids) to 88° C., 5% of a mixture of 280 g water, 3.60 g of SLS (28%), 221 g MMA, 82.7 g BA, 247 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 909 g DI water. The mixture was further cooled to 30° C. and adjusted to pH 8.7 with 4% KOH. The product was then filtered through 100 and 325 mesh screens. To a 1200 g portion of the resulting sample was added 2.46 g of SLS (28%). The sample was 24.9% solids, the CHDF weight average particle diameter was 186 nm, the DLS volume average diameter was 206 nm, and the Tg was −4° C. [estimated].

COMPARATIVE EXAMPLE C

Preparation of inkjet ink binder. After heating 240 g buffered DI water (0.133 meq buffer/g water) and 0.41 g SLS (28% Solids) to 88° C., 5% of a mixture of 280 g water, 3.60 g SLS (28%), 221 g MMA, 82.7 g BA, 247 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 809 g DI water. The mixture was further cooled to 30° C. and adjusted to pH 8.7 with 4% KOH. The product was then filtered through 100 and 325 mesh screens. To a 1200 g portion of the resulting sample was added 2.46 g of SLS (28%). The sample was 25.5% solids, the CHDF weight average particle diameter was 249 nm, the DLS volume average diameter was 269 nm, and the Tg was −4° C. [estimated].

EXAMPLE 3

Preparation of inkjet ink binder. After heating 240 g buffered DI water (0.264 meq buffer/g water) and 0.41 g SLS (28% Solids) to 88° C., 5% of a mixture of 280 g water, 3.60 g SLS (28%), 221 g MMA, 82.7 g BA, 247 g EHA, and 27.5 g MAA was added followed by 2.3 g NaPS. This mixture was held at 88° C. for 10 minutes. Then, the remaining monomer mix was added gradually. After the monomer addition was completed, the vessel was held at 88° C. for 35 minutes and then cooled to 70° C. and held for 15 min, then cooled to 50° C. followed by the addition of 600 g of DI water. The mixture was further cooled to 30° C. and adjusted to pH 8.7 with 4% KOH. The product was then filtered through 100 and 325 mesh screens. To a 1200 g portion of the resulting sample was added 2.46 g of SLS (28%). The sample was 23.7% solids, the CHDF weight average particle diameter was 269 nm, the DLS volume average diameter was 306 nm, and the Tg was −4° C. [estimated].

EXAMPLE 4

Preparation if inkjet ink binder After heating 240 g buffered DI water (0.394 meq buffer/g water) and 0.41 g SLS (28% Solids) to 88° C., 5% of a mixture of 280 g water, 3.60 g SLS (28%), 221 g MMA, 82.7 g BA, 247 g EHA, and 27.5 g MAA was added followed by 2.3 g NaPS. This mixture was held at 88° C. for 10 minutes. Then, the remaining monomer mix was added gradually. The reaction mixture vessel was held at 88° C. for 35 minutes and then cooled to 70° C. and held for 15 min, then cooled to 50° C. followed by the addition of 600 g DI water. The mixture was further cooled to 30° C. and adjusted to pH 8.7 with 4% KOH. The product was then filtered through 100 and 325 mesh screens. To a 1200 g portion of the resulting sample was added 2.46 g of SLS (28%). The sample was 24.7% solids, the CHDF weight average particle diameter was 270 nm, the DLS volume average diameter was 341 nm, and the Tg was −4° C. [estimated].

EXAMPLE 5

Preparation of inkjet ink binder. After heating 240 g buffered DI water (0.580 meq buffer/g water), and 0.41 g SLS (28% Solids) to 88° C., 5% of a mixture of 280 g water, 3.60 g SLS (28%), 221 g MMA, 82.7 g BA, 247 g EHA, and 27.5 g MAA was added followed by 2.3 g NaPS). This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 809 g DI water. The mixture was further cooled to 30° C. and adjusted to pH 8.7 with 4% KOH. The product was then filtered through 100 and 325 mesh screens. To a 1200 g portion of the resulting sample, was added 2.46 g of SLS (28%). The sample was 24.6% solids, the CHDF weight average particle diameter was 258 nm, the DLS volume average diameter was 346 nm, and the Tg was −4° C. [estimated].

EXAMPLE 6

Preparation and Evaluation of Inkjet inks. Inks were prepared from the inkjet in binders of Comparative Examples B-C and of Examples 3-5 in each instance according to Inkjet ink composition 1.

TABLE 6.1

Evaluation of Inkjet inks

| Inkjet Ink Binder of Example | Neutralizer (% equiv.) | Wt. Avg. Diameter (CHDF) | Vol. Avg. Diameter (DLS) | Printing Reliability at Page 90 | Highlighter Resistance |
| --- | --- | --- | --- | --- | --- |
| Comp. B | 0% | 186 nm | 206 nm | 0 | Not tested |
| Comp. C | 10% | 253 | 269 | 36 | Good |
| 3 | 20% | 269 | 306 | 167 | Good |
| 4 | 30% | 270 | 342 | 186/203 | Good |
| 5 | 44% | 258 | 346 | 205 | Good |

Inkjet inks including binder Examples 3-5 of the present invention exhibit good printing reliability and highlighter resistance while those including binder Comparative Examples B-C do not provide acceptable printing reliability.

COMPARATIVE EXAMPLE D

Preparation of inkjet in binder. A reaction vessel containing 242 g buffered DI water (0.574 meq buffer/g water) and 0.39 g KDDBS (29.1% Solids) was heated to 88° C., 6% of a mixture of 280 g water, 3.45 g KDDBS (29.1%), 39.6 g MMA, 128 g BA), 283 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 824 g DI water. The mixture was further cooled to 30° C. and adjusted to pH 8.8 with 4% KOH. The product was then filtered through 100 and 325 mesh screens. The sample was 24.8% solids, the CHDF weight average particle diameter was 349 nm, the DLS volume average diameter was 387 nm, and the Tg was −50° C. [DSC].

EXAMPLE 7

Preparation of inkjet ink binder. A reaction vessel containing 242 g buffered DI water (0.574 meq buffer/g water) and 0.39 g KDDBS (29.1% Solids) was heated to 88° C., 6% of a mixture of 280 g water, 3.45 g KDDBS (29.1%), 100 g MMA, 113 g BA, 337 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 825 g DI water. The mixture was further cooled to 30° C. and adjusted to pH 8.7 with 4% KOH. The product was then filtered through 100 and 325 mesh screens. The sample was 24.8% solids, the CHDF weight average particle diameter was 306 nm, the DLS volume average diameter was 378 nm, and the Tg was −39° C. [DSC].

EXAMPLE 8

Preparation of inkjet ink binder. A reaction vessel containing 242 g buffered DI water (0.574 meq buffer/g water), and 0.39 g KDDBS (29.1% Solids) was heated to 88° C., 6% of a mixture of 280 g water, 3.45 g KDDBS (29.1%), 161 g MMA, 97.8 g BA, 292 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 825 g DI water. The mixture was further cooled to 30° C. and adjusted to pH 8.7 with 4% KOH. The product was then filtered through 100 and 325 mesh screens. The sample was 24.8% solids, the CHDF weight average particle diameter was 295 nm, the DLS volume average diameter was 376 nm, and the Tg was −22° C. [DSC].

EXAMPLE 9

Preparation of inkjet ink binder. A reaction vessel containing 242 g buffered DI water (0.574 meq buffer/g water) and 0.39 g KDDBS (29.1% Solids) was heated to 88° C., 6% of a mixture of 280 g water, 3.45 g KDDBS (29.1%), 191 g MMA, 90.2 g BA, 269 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 825 g of deionized water. The mixture was further cooled to 30° C. and adjusted to pH 9.0 with 4% KOH. The product was then filtered through 100 and 325 mesh screens. The sample was 25.7% solids, the CHDF weight average particle diameter was 288 nm, the DLS volume average diameter was 376 nm, and the Tg was −12° C. [DSC].

EXAMPLE 10

Preparation of inkjet ink binder. A reaction vessel containing 242 g buffered DI water (0.574 meq buffer/g water), and 0.39 g KDDBS (29.1% Solids) was heated to 88° C., 6% of a mixture of 280 g water, 3.45 g KDDBS (29.1%), 221 g MMA, 82.7 g BA, 247 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 825 g DI water. The mixture was further cooled to 30° C. and adjusted to pH 8.7 with 4% KOH. The product was then filtered through 100 and 325 mesh screens. The sample was 24.9% solids, the CHDF weight average particle diameter was 304 nm, the DLS volume average diameter was 393 nm, and the Tg was −3.4° C. [DSC].

EXAMPLE 11

Preparation of inkjet ink binder. A reaction vessel containing 242 g buffered DI water (0.264 meq buffer/g water), and 0.39 g KDDBS (29.1% Solids) was heated to 88° C., 6% of a mixture of 280 g water, 3.45 g KDDBS (29.1%), 342 g MMA, 52.2 g BA, 156 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 593 g DI water. The mixture was further cooled to 30° C. and adjusted to pH 8.9 with 4% KOH. The product was then filtered through 100 and 325 mesh screens. The sample was 24.7% solids, the CHDF weight average particle diameter was 306 nm, the DLS volume average diameter was 353 nm, and the Tg was +40° C. [DSC].

EXAMPLE 12

Preparation and Evaluation of Inkjet inks. Inks were prepared from the inkjet in binders of Comparative Example D and of Examples 7-11 in each instance according to Inkjet ink composition 1.

TABLE 12.1

Evaluation of inkjet inks

| Inkjet Ink Binder of Example | Tg ° C. (DSC) | Wt. Avg. Diameter (CHDF) | Vol. Avg. Diameter (DLS) | Printer Reliability at Page 90 | Highlighter Resistance |
|---|---|---|---|---|---|
| Comp. D | −50.4 | 349 | 387 | <2 | Good+ |
| 7 | −39.5 | 306 | 378 | 48 | Good+ |
| 8 | −21.5 | 294 | 376 | 201 | Good+ |
| 9 | −12 | 288 | 376 | 205 | Good+ |
| 10 | −3.4 | 304 | 393 | 207 | Good |
| 11 | +40.0 | 306 | 353 | 206 | Good |

Inkjet inks including binder Examples 7-11 of the present invention exhibit good printing reliability and highlighter resistance while that including binder Comparative Example D does not provide acceptable printing reliability.

EXAMPLE 13

Preparation if inkjet ink binder. After heating a reaction vessel containing 240 g buffered DI water (0.580 meq buffer/g water), and 0.41 g SLS (28% Solids) to 88° C., 6% of a mixture of 280 g water, 3.60 g SLS (28%), 221 g MMA, 82.7 g BA, 247 g EHA, and 27.5 g MAA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 809 g DI water. The mixture was further cooled to 30° C. and adjusted to pH 8.8 with 4% KOH. The product was then filtered through 100 and 325 mesh screens. The sample was 24.6% solids, the CHDF weight average particle diameter was 281 nm, the DLS volume average diameter was 371 nm, and the Tg was −4° C. [estimated].

EXAMPLE 14

Preparation of inkjet ink binder. After heating a reaction vessel containing 240 g buffered DI water (0.609 meq buffer/g water) and 0.41 g SLS (28% Solids) to 88° C., 6% of a mixture of 280 g water, 3.60 g SLS (28%), 221 g MMA, 82.7 g BA, 247 g EHA, 20.6 g MAA, and 6.9 g AA was added followed by 2.3 g NaPS. This mixture was held at 88° C. for 10 minutes. Then, the remaining monomer mixture was added gradually. The reaction mixture was held at 88° C. for 35 minutes and then cooled to 70° C. and held for 15 min, then cooled to 50° C. followed by the addition of 790 g DI water. The mixture was further cooled to 30° C. and adjusted to pH 9.0 with 4% KOH. The product was then filtered through 100 and 325 mesh screens. The sample was 24.4% solids, the CHDF weight average particle diameter was 274 nm, the DLS volume average diameter was 357 nm, and the Tg was −4° C. [estimated].

EXAMPLE 15

Preparation of inkjet ink binder. After heating a reaction vessel containing 240 g buffered DI water (0.637 meq buffer/g water), and 0.41 g SLS (28% Solids) to 88° C., 6% of a mixture of 280 g water, 3.60 g SLS (28%), 221 g MMA), 82.7 g BA, 247 g EHA, 13.8 g MAA, and 13.8 g AA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 772 g DI water. The mixture was further cooled to 30° C. and adjusted to pH 8.7 with 4% KOH. The product was then filtered through 100 and 325 mesh screens. The sample was 24.3% solids, the CHDF weight average particle diameter was 283 nm, the DLS volume average diameter was 370 nm, and the Tg was −4° C. [estimated].

EXAMPLE 16

Preparation of inkjet ink binder. After heating a reaction vessel containing 240 g buffered DI water (0.665 meq buffer/g water), and 0.41 g SLS (28% Solids) to 88° C., 6% of a mixture of 280 g water, 3.60 g SLS (28%), 221 g MMA, 82.7 g BA, 247 g EHA, 6.90 g MAA, and 20.6 g AA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 757 g DI water. The mixture was further cooled to 30° C. and adjusted to pH 8.7 with 4% KOH. The product was then filtered through 100 and 325 mesh screens. The sample was 24.1% solids, the CHDF weight average particle diameter was 304 nm, the DLS volume average diameter was 409 nm, and the Tg was −4° C. [estimated].

EXAMPLE 17

Preparation of inkjet ink binder. After heating a reaction vessel containing 240 g buffered DI water (0.693 meq buffer/g water), and 0.41 g SLS (28% Solids) to 88° C., 6% of a mixture of 280 g water, 3.60 g SLS (28%), 221 g MMA, 82.7 g BA, 247 g EHA, and 27.5 g AA was added followed by 2.3 g NaPS. This mixture was held at 88° C. for 10 minutes. Then, the remaining monomer mix was added gradually. The reaction mixture was held at 88° C. for 35 minutes and then cooled to 70° C. and held for 15 min, then cooled to 50° C. followed by the addition of 739 g DI water. The mixture was further cooled to 30° C. and adjusted to pH 9.0 with 4% KOH. The product was then filtered through 100 and 325 mesh screens. The sample was 24.5% solids, the CHDF weight average particle diameter was 301 nm, the DLS volume average diameter was 407 nm, and the Tg was −4° C. [estimated].

EXAMPLE 18

Preparation and Evaluation of Inkjet inks. Inks were prepared from the inkjet ink binders of Examples 13-17 in each instance according to Inkjet ink composition 1.

TABLE 18.1

Evaluation of Inkjet Inks

| Inkjet Ink Binder of Example | Wt % MAA | Wt % AA | Wt. Avg. Diameter (CHDF) | Vol. Avg. Diameter (DLS) | Printing Reliability at Page 90 | High-lighter Resistance |
|---|---|---|---|---|---|---|
| 13 | 4.7 | 0.0 | 281 | 371 | 203 | Good |
| 14 | 3.5 | 1.2 | 274 | 357 | 189 | Good |
| 15 | 2.35 | 2.35 | 283 | 370 | 196 | Good |
| 16 | 1.2 | 3.5 | 304 | 410 | 206 | Good |
| 17 | 0.0 | 4.7 | 301 | 407 | 204 | Good |

Inkjet Inks including binder Examples 13-17 of the present invention show that different acid groups or mixtures thereof can be used and exhibit good printing reliability and highlighter resistance.

What is claimed is:

1. An inkjet ink composition comprising a colorant, a liquid medium, and an inkjet ink binder, said binder comprising an aqueous dispersion of polymer particles, said polymer comprising as polymerized units from 3 to 20 wt. % monoethylenically unsaturated acid monomer, based on polymer weight, and having a glass transition temperature (Tg) in the range of from −40° C. to 120° C., and said polymer particles having a volume average particle diameter as measured by dynamic light scattering of at least 35 nanometers greater than the weight average particle diameter as measured by capillary hydrodynamic fractionation; and
wherein said polymer particles have been formed by emulsion polymerization in the presence of a neutralizer in the amount of from 20 to 75%, on an equivalents basis, based on said monoethylenically unsaturated acid monomer.

2. The inkjet ink composition of claim 1 wherein said polymer particles have a volume average particle diameter as measured by dynamic light scattering of at least 45 nanometers greater than the weight average particle diameter as measured by capillary hydrodynamic fractionation.

3. The inkjet ink composition of claim 1 wherein said polymer particles have a volume average particle diameter as measured by dynamic light scattering of at least 55 nanometers greater than the weight average particle diameter as measured by capillary hydrodynamic fractionation.

4. The inkjet ink composition of claim 1 wherein the neutralizer is a hard base.

5. The inkjet ink composition of claim 1 wherein said polymer particles have a weight average particle diameter of from 100 to 450 nanometers.

6. The inkjet ink composition of claim 1 wherein said colorant comprises a pigment.

7. The inkjet ink composition of claim 6, wherein said pigment is surface-modified to be self dispersing.

8. The inkjet ink composition of claim 6, wherein said Tg is in the range of from about −300° C. to about 100° C.

9. The inkjet ink composition of claim 7, wherein the glass transition temperature ranges from about −20° C. to about +25° C.

10. The inkjet ink composition of claim 7 wherein said acid monomer comprises methacrylic acid.

11. The inkjet ink composition of claim 7 wherein said acid monomer comprises acrylic acid.

12. The inkjet ink composition of claim 7 wherein said acid monomer ranges from about 3% to about 6% by weight of said polymer.

13. The inkjet ink composition of claim 7 wherein said ink composition comprises from about 0.5% to about 10% colorant, by weight of said ink composition, and from about 0.1% to about 10% polymer by weight of said ink composition.

14. The inkjet ink composition of claim 7 wherein said ink composition comprises from about 0.5% to about 7% colorant by weight of the ink composition; and from about 2% to about 3% polymer by weight of the ink composition.

15. The inkjet ink composition of claim 7 wherein said ink composition comprises from about 1% to about 6% colorant by weight of the ink composition and said polymer is present at about 2% by weight of the ink composition.

16. The inkjet ink composition of claim 7 wherein the glass transition temperature of said polymer is about −2.5° C. and the weight average molecular weight of said polymer is about 450,000.

17. The inkjet ink composition of claim 7 wherein said colorant comprises a self-dispersed pigment and a dispersed pigment mixture.

18. The inkjet ink composition of claim 7 wherein said inkjet ink binder further comprises a surfactant.

19. The inkjet ink composition of claim 12 wherein said binder comprises one or more surfactants selected from the group consisting of sodium lauryl sulfate, sodium allyl dodecyl sulfosuccinate, sodium linear-dodecyl benzenesulfonate, allylammonium nonphenol-(EO)10-phosphate, ammonium lauryl sulfate, linear (C12-14 alkyl)-(EO)4-sodium sulfate, potassium linear-dodecyl benzenesulfonate, and combinations thereof.

20. The inkjet ink composition of claim 7 wherein the Tg of said polymer ranges from −20° C. to about 0° C. and the weight average molecular weight of the polymeric binder ranges from about 300,000 to about 450,000.

21. The inkjet ink composition of claim 7 further comprising a surfactant.

22. The inkjet ink composition of claim 7 wherein said polymer comprises one or more monomers selected from the group consisting of acrylates, methacrylates, substituted styrenes, styrenes, fluoromethacrylates, vinyl acetate, acrylamides, substituted acrylamides, methacrylamides and substituted methacrylamides; and said acid monomer selected from the group consisting of acrylic acid, methacrylic acid, itaconic acid, maleic acids, vinylsulfonic acids and acids derived from methacrylic anhydride, maleic anhydride, sodium vinylsulfonate or acrylamido propane sulfonate, and combinations thereof.

23. The inkjet ink composition of claim 7 wherein said inkjet ink binder further comprises a mixture of a plurality of larger particles and a plurality of smaller particles, and further wherein the binder mixture is bimodal.

24. The inkjet ink composition of claim 7 further comprising a humectant and a penetrant, wherein said humectant ranges from about 1% to about 30% by weight of the ink composition and said penetrant ranges from about 0.01% to about 10% by weight of said ink composition.

25. The inkjet ink composition of claim 7 wherein the binder mixture is unimodal.

* * * * *